United States Patent
Leone

[15] 3,675,506
[45] July 11, 1972

[54] MAGNETIC ROTOR ASSEMBLY

[72] Inventor: Nick A. Leone, Lohrville, Rte. 1, Redgranite, Wis. 54970

[22] Filed: July 14, 1970

[21] Appl. No.: 54,804

Related U.S. Application Data

[63] Continuation-in-part of Ser. No. 625,804, March 24, 1967, abandoned.

[52] U.S. Cl. ............................. 74/572, 74/DIG. 4, 58/116 M
[51] Int. Cl. ............................................................ G05g 1/00
[58] Field of Search ............. 74/572, 568, DIG. 4; 58/116 M

[56] References Cited

UNITED STATES PATENTS 3,089,425  5/1963  Sprague et al. .................... 74/DIG. 4
2,790,095  4/1957  Peek et al. .......................... 74/DIG. 4

*Primary Examiner*—William F. O'Dea
*Assistant Examiner*—Wesley S. Ratliff, Jr.
*Attorney*—Clarence A. O'Brien and Harvey B. Jacobson

[57] ABSTRACT

A magnetic flywheel assembly in which a pair of drivingly interconnected rotors produce reciprocatory movement of a magnetic member to mechanically and magnetically vary the torque exerted on each rotor during each rotational cycle. The reciprocatory member is slidably mounted between the rotors and connected by links and crankpins to the rotors. Magnetic elements are carried by the reciprocatory member and the rotors.

9 Claims, 6 Drawing Figures

Nick A. Leone
INVENTOR.

BY *Clarence A. O'Brien*
*and Harvey B. Jacobson*
Attorneys

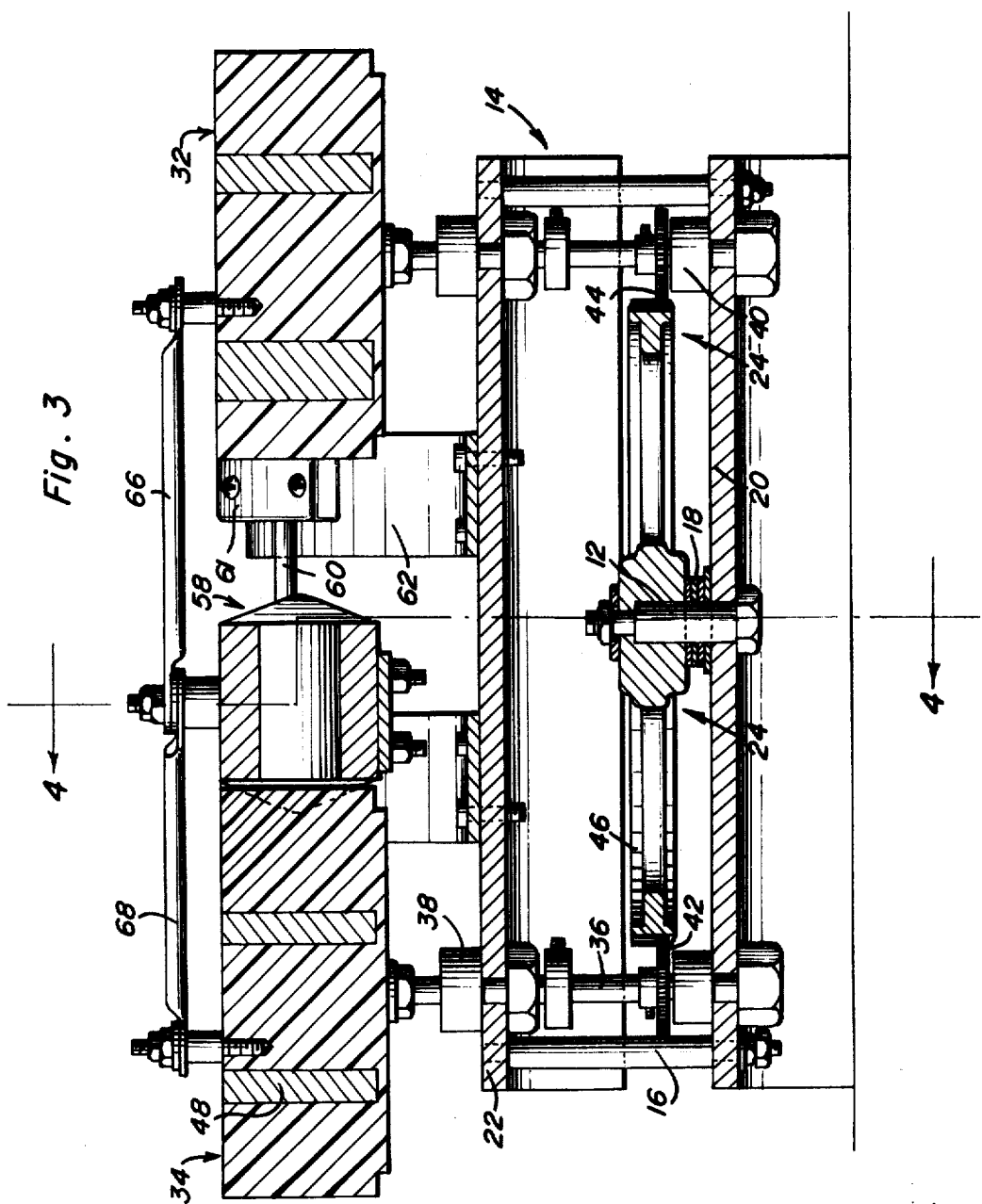

Nick A. Leone

MAGNETIC ROTOR ASSEMBLY

This invention relates to conversion of energy in general and to the storing and release of mechanical energy by mechanical and magnetic means and is similar to the arrangement disclosed in my prior copending application, Ser. No. 625,710, filed Mar. 24, 1967 now abandoned, with respect to which this application is a continuation-in-part.

The use of flywheels is well known in order to absorb and release mechanical energy being transmitted to a rotational load and is useful in connection with varying loads. Thus, input torque to a transmission may be varied to accommodate load variations. Load variation is also a problem in repulsion types of electrodynamic machines, for example, wherein a rotor is subject to a pulsating magnetic drag.

It is therefore an important object of the present invention to provide a flywheel assembly which employs mechanical and magnetic means to cyclically vary the output torque transmitted from a constant source of motive energy in order to accommodate a cyclically varying load such as a pulsating magnetic drag exerted on a rotor.

In accordance with the present invention, a pair of rotors are driven through a common drive gear and the output torque cyclically varied by interconnecting the rotors with a slide member for reciprocation thereof. By use of magnetic elements in the rotors and the slide member, the mechanically produced variation in torque is modified, resulting in a unidirectional output torque variation. This torque variation characteristic may be useful in meeting certain pulsating load demands. Also, by use of magnetic elements in the rotors, speed control may be externally applied to the flywheel assembly by magnetic drag means avoiding friction brake contact.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged side sectional view taken substantially through a plane indicated by section line 3—3 in FIG. 1.

Figure 5:
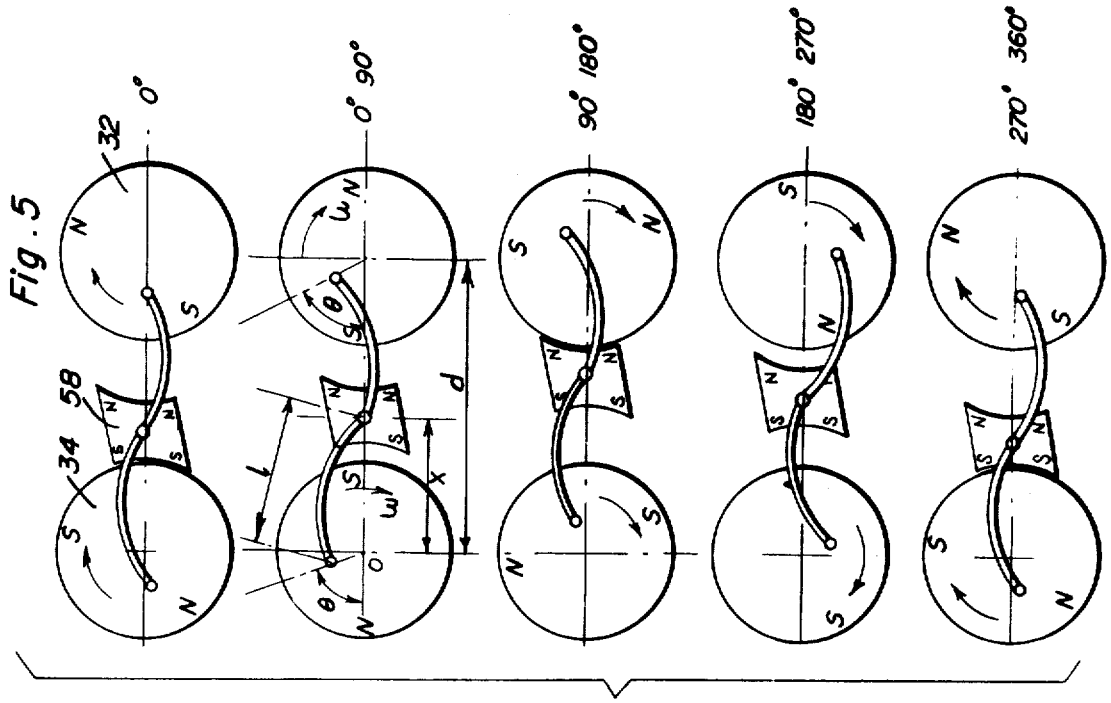
Figure 4:
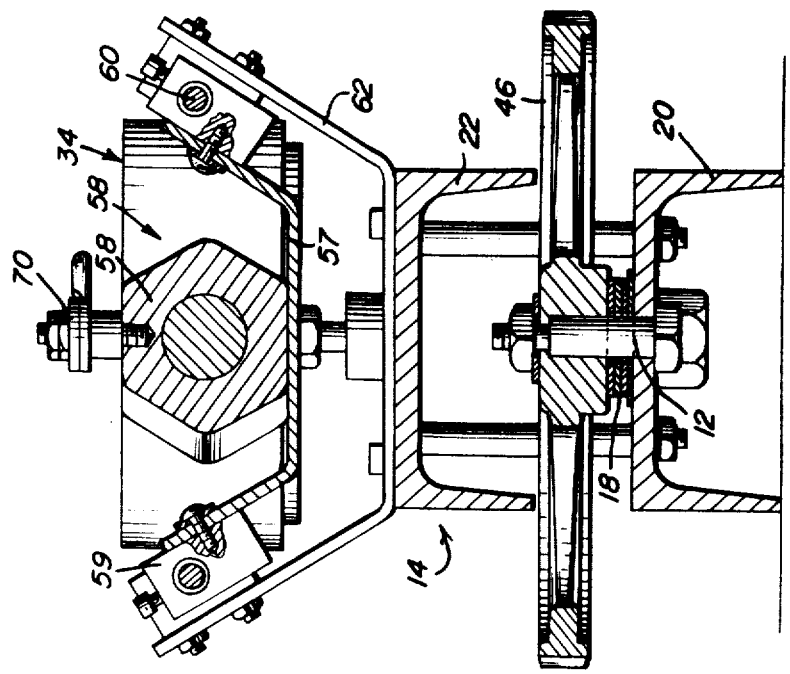
FIG. 4 is a transverse sectional view taken substantially through a plane indicated by section line 4—4 in FIG. 3.

FIG. 5 schematically illustrates the rotor assembly of the present invention in various operational phases.

Figure 6:
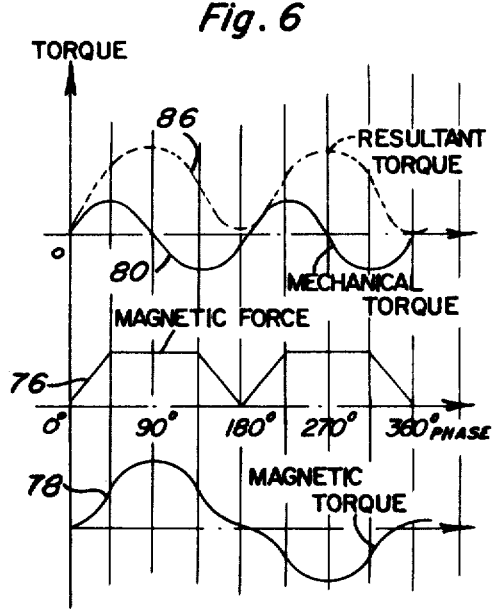

FIG. 6 is a graphical illustration showing typical torque characteristics associated with the apparatus of the present invention.

Referring now to the drawings in detail, FIGS. 1 through 4 illustrate the rotor assembly of the present invention generally denoted by reference numeral 10. The rotor assembly is shown independent of any associated apparatus. A frame assembly generally denoted by reference numeral 14 supports the various parts of the rotor assembly and includes base 20. A support 22 is vertically spaced above the base by spacer bolt assemblies 16 in order to mount between the base and support, a gear assembly generally referred to by reference numeral 24. Mechanical energy is supplied to the rotor assembly through the gear assembly 24.

Mounted above the support 22 are two rotors 32 and 34. The rotors as well as the frame assembly 14, are made of a suitable non-magnetic material. Each rotor is similar in construction and is connected to a shaft 36 rotatably mounted by a bearing assembly 38 on support 22 and by a thrust bearing assembly 40 secured to the base 20. The gear assembly 24 drivingly interconnects the rotors for rotation about parallel spaced axes extending through the shafts 36. The gear assembly includes pinion gears 42 and 44 secured to each of the shafts 36 above the bearings 40. The pinion gears are enmeshed with a drive gear 46 to which a stub shaft 12 is secured for rotatable support of the drive gear 46 by the bearing 18 on the base 20. It will be apparent therefore, that the rotors 32 and 34 will be rotated in timed relation to each other at a fixed speed ratio. Input power is supplied to the apparatus through the drive gear 46 which may accordingly be enmeshed with a power input gear from any suitable source of motive energy. Also, as more clearly seen in FIG. 1, the rotors are rotated in the same rotational direction (clockwise) and at the same speed.

Figure 1:
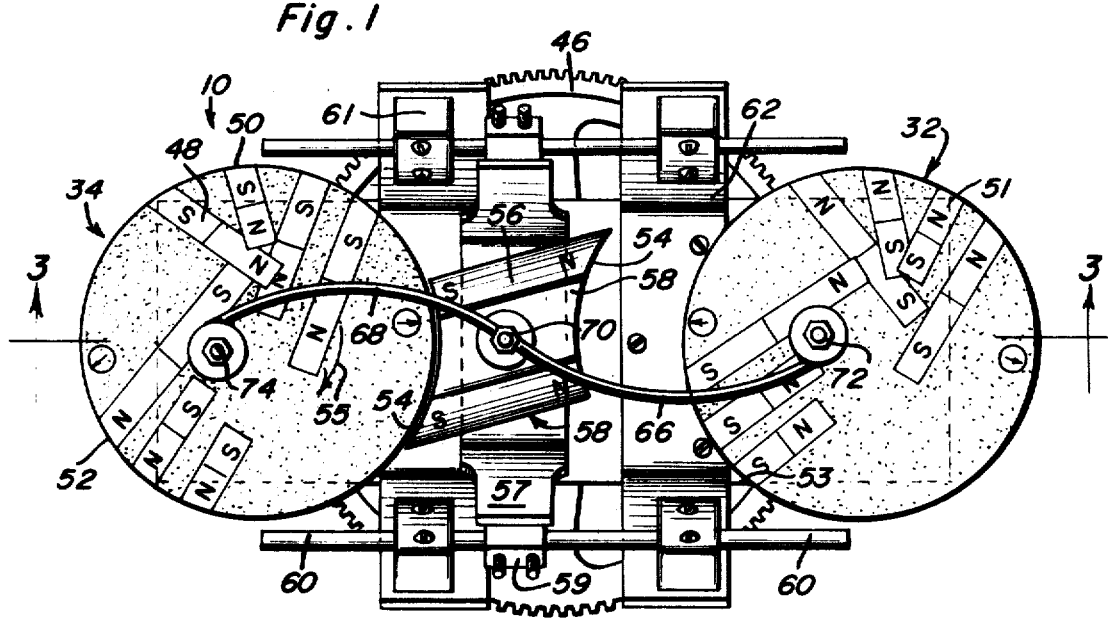
FIG. 1 is a top plan view of the magnetic rotor assembly of the present invention.
Figure 2:
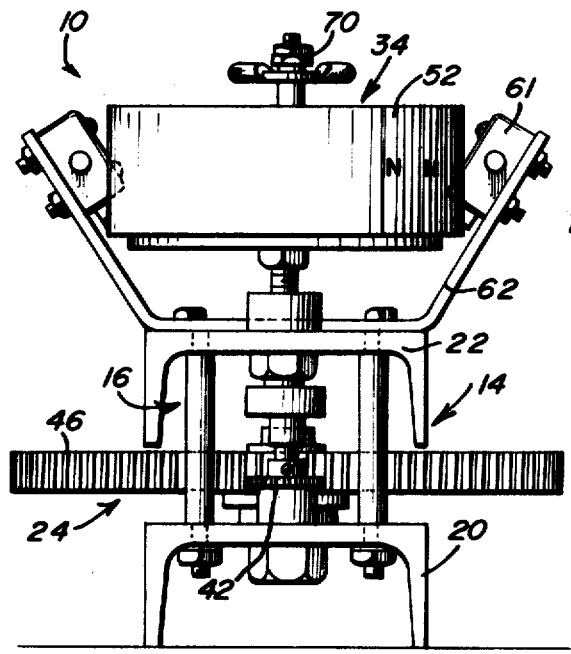
FIG. 2 is a side elevational view of the assembly shown in FIG. 1.

While the body of each rotor 32 and 34 is made of a non-magnetic material as hereinbefore indicated, permanent magnet bars 48 are embedded therein and arranged as more clearly seen in FIG. 1 so that the south pole faces 50 on four magnetic bars of rotor 34, are angularly spaced by a substantial distance from three north pole faces 52. On the other hand, four north pole faces 51 are peripherally exposed adjacent to each other on the rotor 32 and are angularly spaced by a substantial distance from three closely spaced south pole faces 53. In view of this disposition of the pole faces 50 and 52 on the rotor 34 and 51 and 53 on the rotor 32, a unidirectional torque is established in a clockwise direction as indicated by arrows 55 in FIG. 1.

The pole faces of the rotor bar magnets 48 cooperate with end pole faces 54 associated with a pair of bar magnets 56 carried by an inertia slide member 58 adapted to be reciprocated along a fixed path intersecting the rotational axes of the rotors 32 and 34. The slide member 58 is carried on a transversely extending bracket 57 secured at the ends thereof to slide blocks 59 through which guide rods 60 extend. The guide rods are secured by fastener blocks 61 to a pair of spaced mounting brackets 62 fixedly secured by fasteners to the support 22. The guide rods 60 are fixed to the frame assembly in parallel spaced relation to the path along which the slide member 58 is reciprocated between the rotors. Also, the slide member 58 is angularly related to the path along which it is reciprocated and the end faces 54 on the bar magnets 56 form part of a surface curvature substantially equal to the circular curvature of the periphery of the rotors through which the pole faces of the bar magnets 48 are exposed.

The reciprocatory stroke of the slide member 58 is such that its limit positions are closely spaced from the periphery of the rotors and when the slide member is in its limit positions, the pole faces 54 occupy a predetermined relationship to the pole faces of the bar magnets 48 as shown in FIG. 1. Reciprocatory movement is imparted to the slide member by link connections to the rotors including curved connecting rods 66 and 68, the adjacent ends of which are pivotally connected to a common wrist pin assembly 70 at the center of the slide member 58. The opposite remote ends of the connecting rods 66 and 68 are respectively interconnected with the rotors 32 and 34 by crankpin connections 72 and 74. By virtue of the curvature of the connecting rods, dead centering of the linkage mechanism is avoided.

Operation of the rotor assembly will be apparent by reference to the diagrammatic illustrations of FIG. 5 wherein it will be noted that the slide member 58 undergoes a cyclic reciprocatory movement in response to rotation of the rotors and that the magnets carried by the rotors and the slide member are such that the slide member is magnetically repelled from an adjacent rotor when departing therefrom while at the same time it is attracted to the opposite rotor. Thus, the magnetically produced, linear accelerating force exerted on the slide member 58 may vary as depicted, for example, by curve 76 in FIG. 6 resulting in a magnetically induced variable torque exerted on the rotors as indicated by curve 78. Also, in view of the mechanically induced reciprocation of the slide member 58, the torque exerted on the rotors will cyclically vary in accordance with the curve 80 as shown in FIG. 6. Thus, the rotors will experience a unidirectional, output torque which is the resultant of the curves 80 and 78 as depicted by curve 86 in FIG. 6. It should of course be appreciated that the foregoing curves of FIG. 6 are idealized and approximate. These curves may be determined from a dynamic analysis of the mechanism having the geometrical relationships as diagrammatically shown in FIG. 5, assuming the rotor is driven at a constant angular speed.

It will be apparent from the foregoing description, that the rotor assembly will provide an output torque characteristic suitable to meet certain pulsating load demands such as experienced by rotors in repulsion types of electrodynamic machines. Further, since magnets are employed in the rotors, speed control may be exercised by use of magnetic means (not shown) external to the disclosed apparatus to thereby avoid the frictional contact associated with ordinary brake controls.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an energy converting device, a frame, rotor means mounted by the frame for rotation, inertia means reciprocably mounted by the frame, mechanical means interconnecting the inertia and rotor means and responsive to rotation of said rotor means for cyclically varying torque applied to the rotor means, and magnetic means mounted by the rotor means and the inertia means for cyclically modifying the variation in torque applied to the rotor means during rotation thereof.

2. The combination of claim 1 wherein said rotor means includes a pair of rotors rotatable about rotational axes intersected by a path along which the inertia means is reciprocated between limits spaced from the axes.

3. The combination of claim 2 including input drive means for imparting rotation to the rotors in timed relation to each other.

4. The combination of claim 3 wherein said magnetic means includes flux emitting poles peripherally mounted on the rotors and a pair of end pole faces mounted by the inertia means, the end pole faces and the poles on the rotors being of the same polarity and closely spaced from each other in the limit positions of the inertia means.

5. The combination of claim 4 wherein the means for imparting cyclic motion includes a crankpin connected to each of the rotors, a connecting rod connected to each of said crankpins, and a common wrist pin connecting the connecting rods to the inertia means.

6. In an energy converting device, a frame, a pair of rotors rotatable about rotational axes intersected by a predetermined path, means reciprocably mounted by the frame for varying the torque applied to the rotors, means responsive to rotation of said rotors for imparting cyclic motion to said torque varying means between limit positions spaced from said axes along said predetermined path, magnetic flux emitting poles peripherally mounted on the rotors and a pair of end pole faces mounted by the torque varying means, the end pole faces and the poles on the rotors being of the same polarity and closely spaced from each other in the limit positions of the torque varying means, whereby said variation in torque applied to the rotors is cyclically modified.

7. The combination of claim 6 wherein the means for imparting cyclic motion includes a crankpin connected to each of the rotors, a connecting rod connected to each of said crankpins, and a common wrist pin connecting the connecting rods to the torque varying means.

8. The combination of claim 2 wherein the means for imparting cyclic motion includes a crankpin connected to each of the rotors, a connecting rod connected to each of said crankpins, and a common wrist pin connecting the connecting rods to the inertia means.

9. In an energy converting device, a frame, a pair of rotors mounted by said frame for rotation about spaced axes, inertia means mounted by the frame for cyclic movement between limit positions closely spaced from the rotors, mechanical means interconnecting the rotors with the inertia means for varying torque applied to the rotors in response to said cyclic movement during rotation of the rotors, magnetic flux emitting poles peripherally mounted on the rotors, and a pair of end pole faces mounted on the inertia means of the same polarity as the poles on the rotors in the limit positions of the inertia means.

* * * * *